May 22, 1951 A. L. STONE 2,553,836
DRILL PIPE CONNECTION
Filed Sept. 17, 1945 9 Sheets-Sheet 1
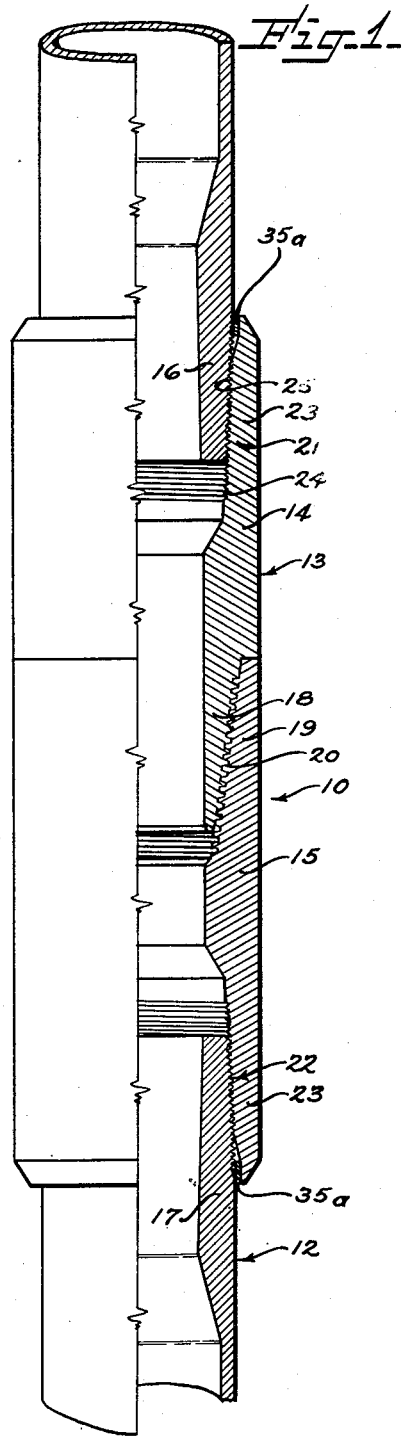
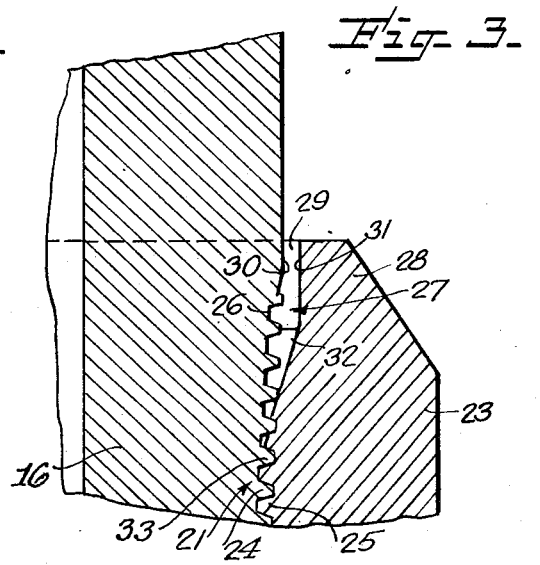
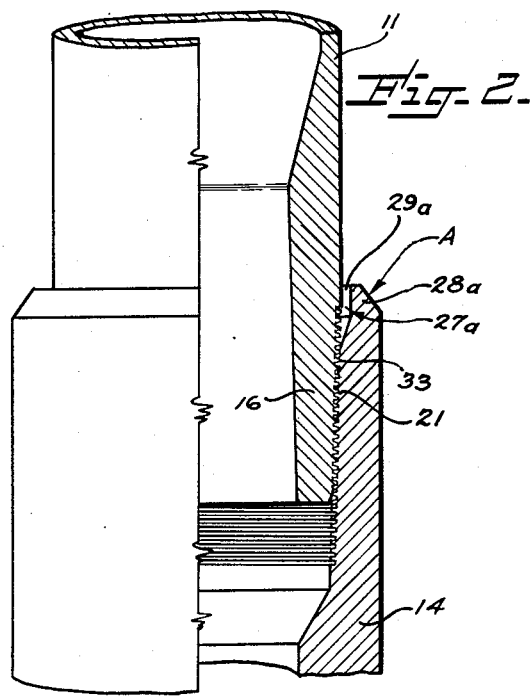
Inventor
Albert L. Stone
Bartholow & Scantlebury
Attys.

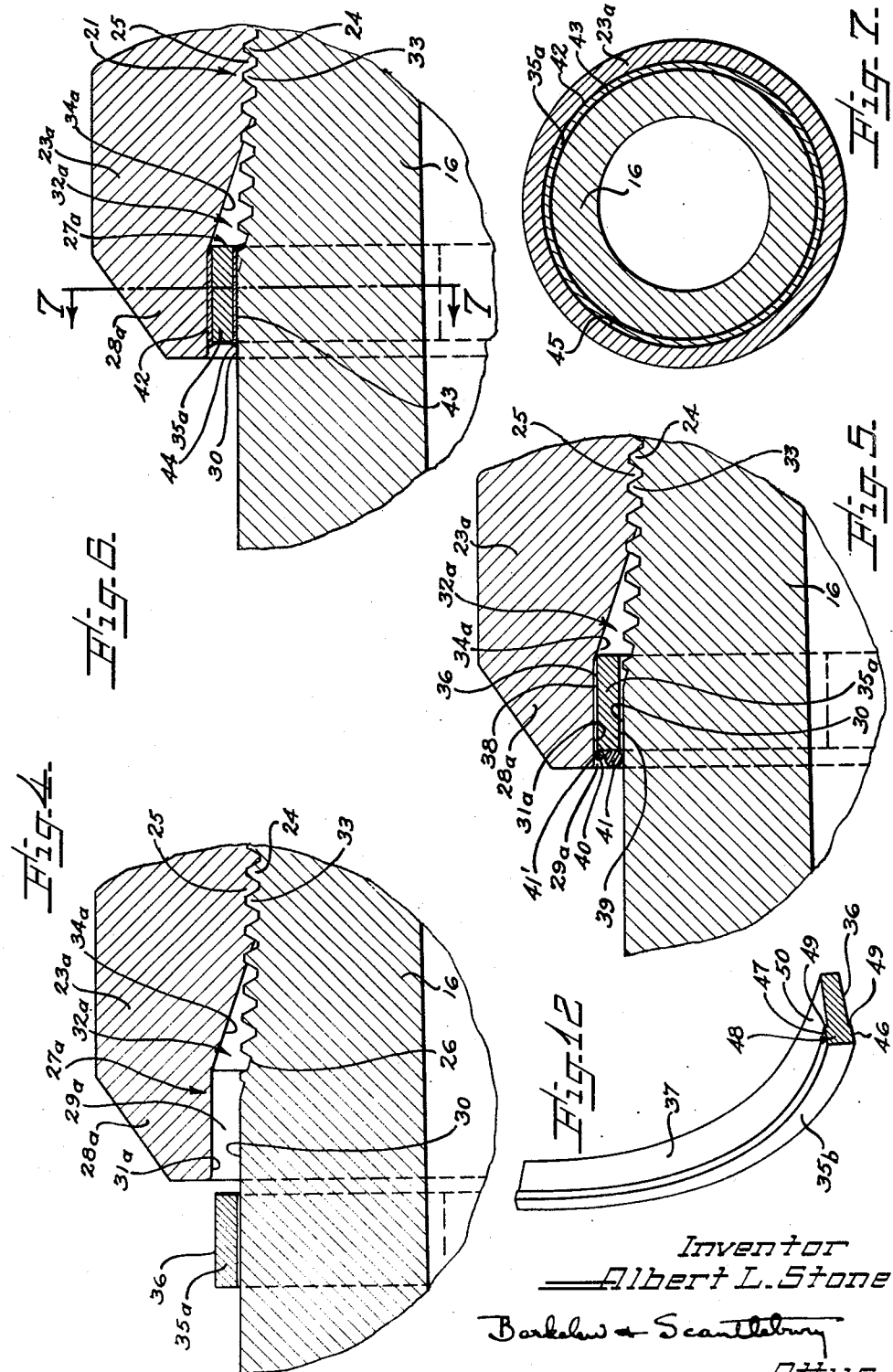

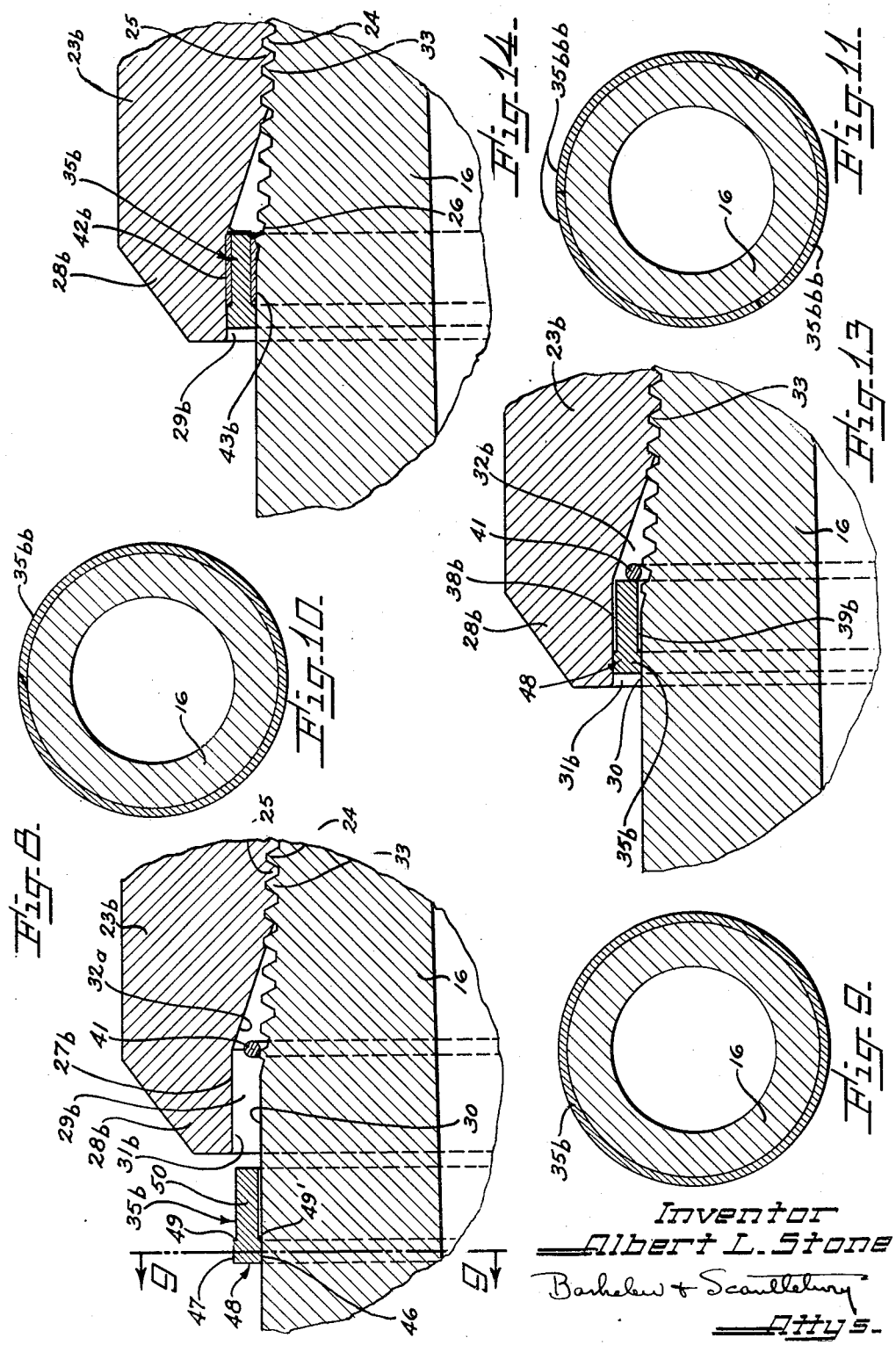

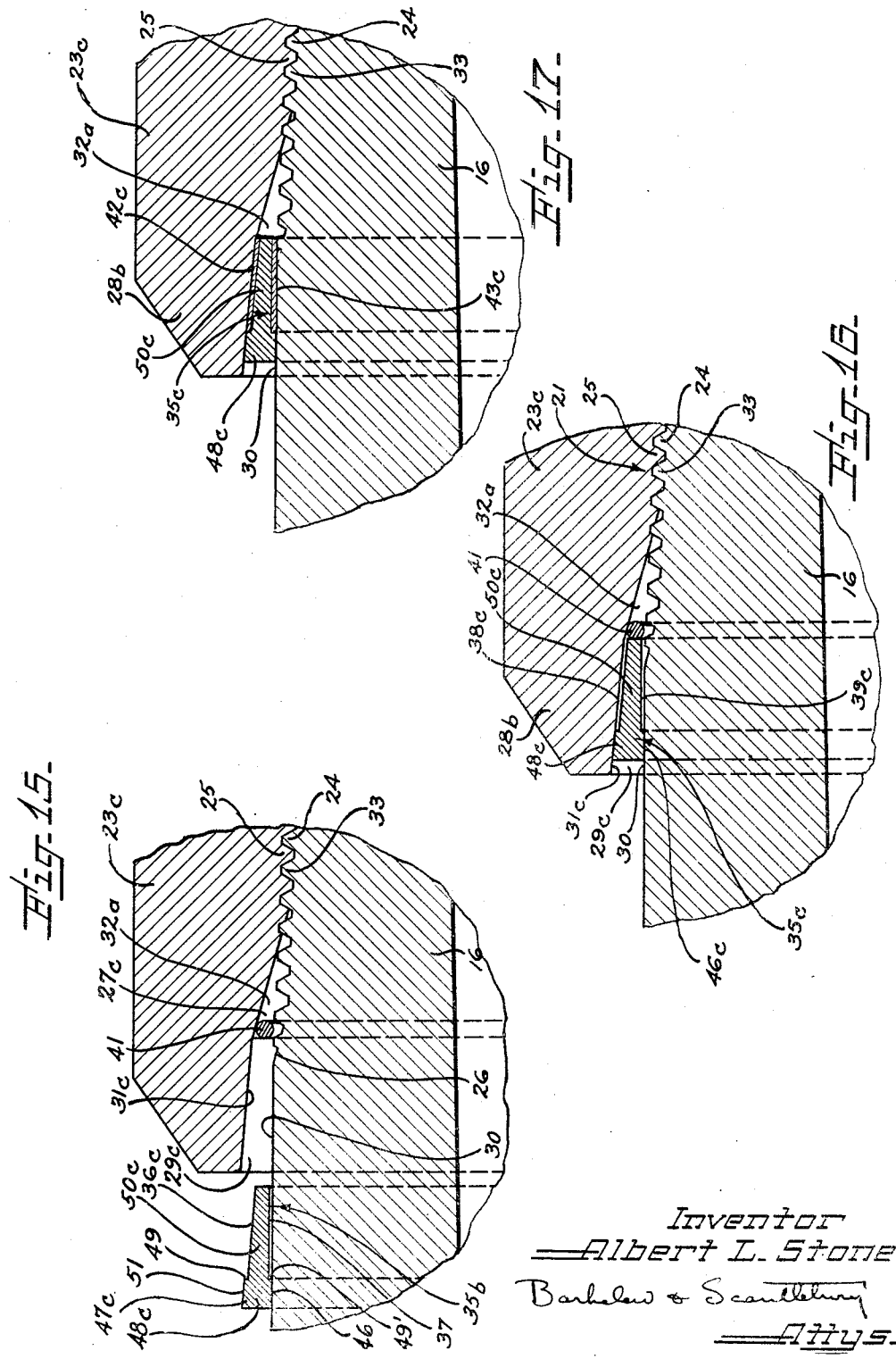

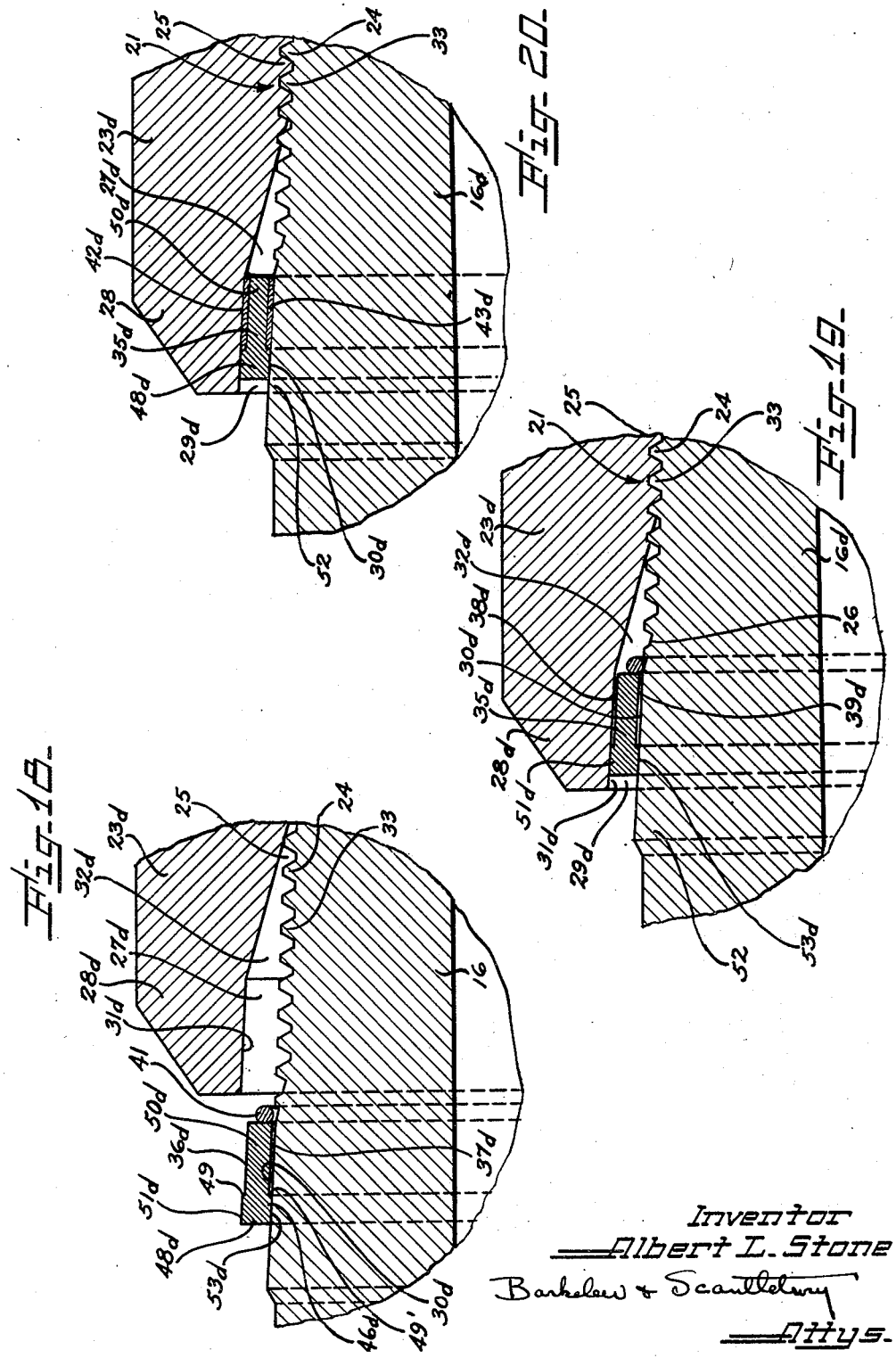

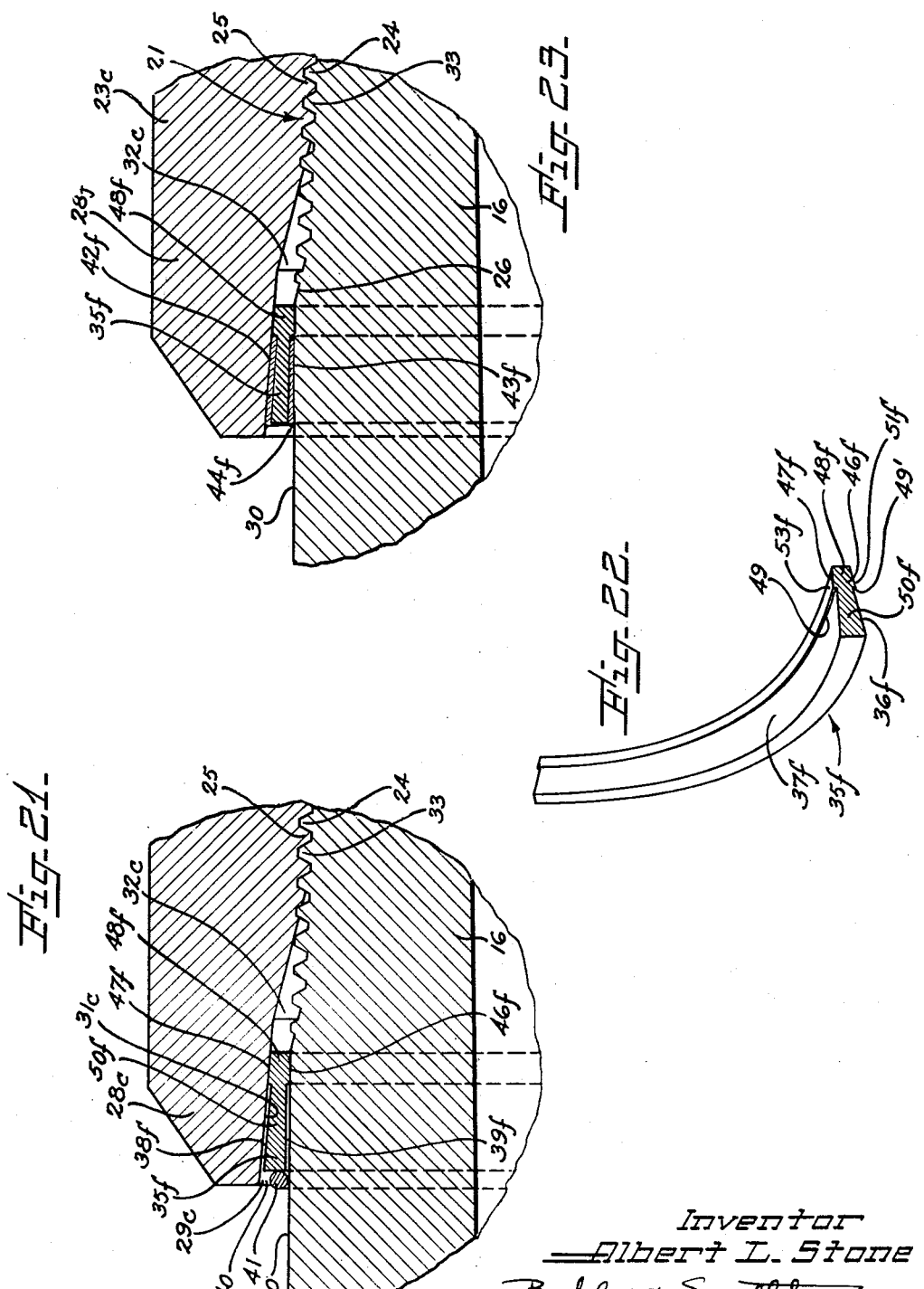

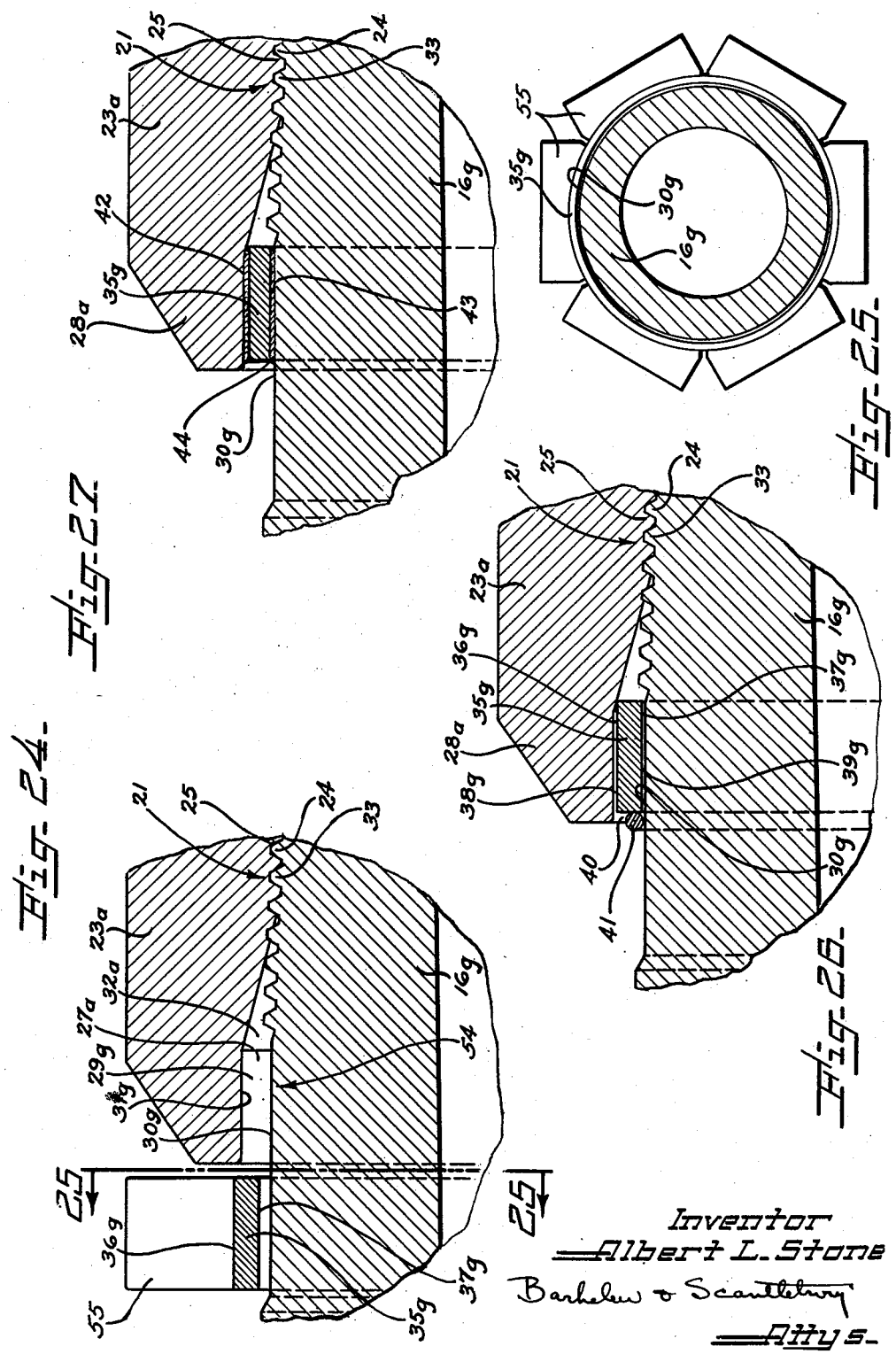

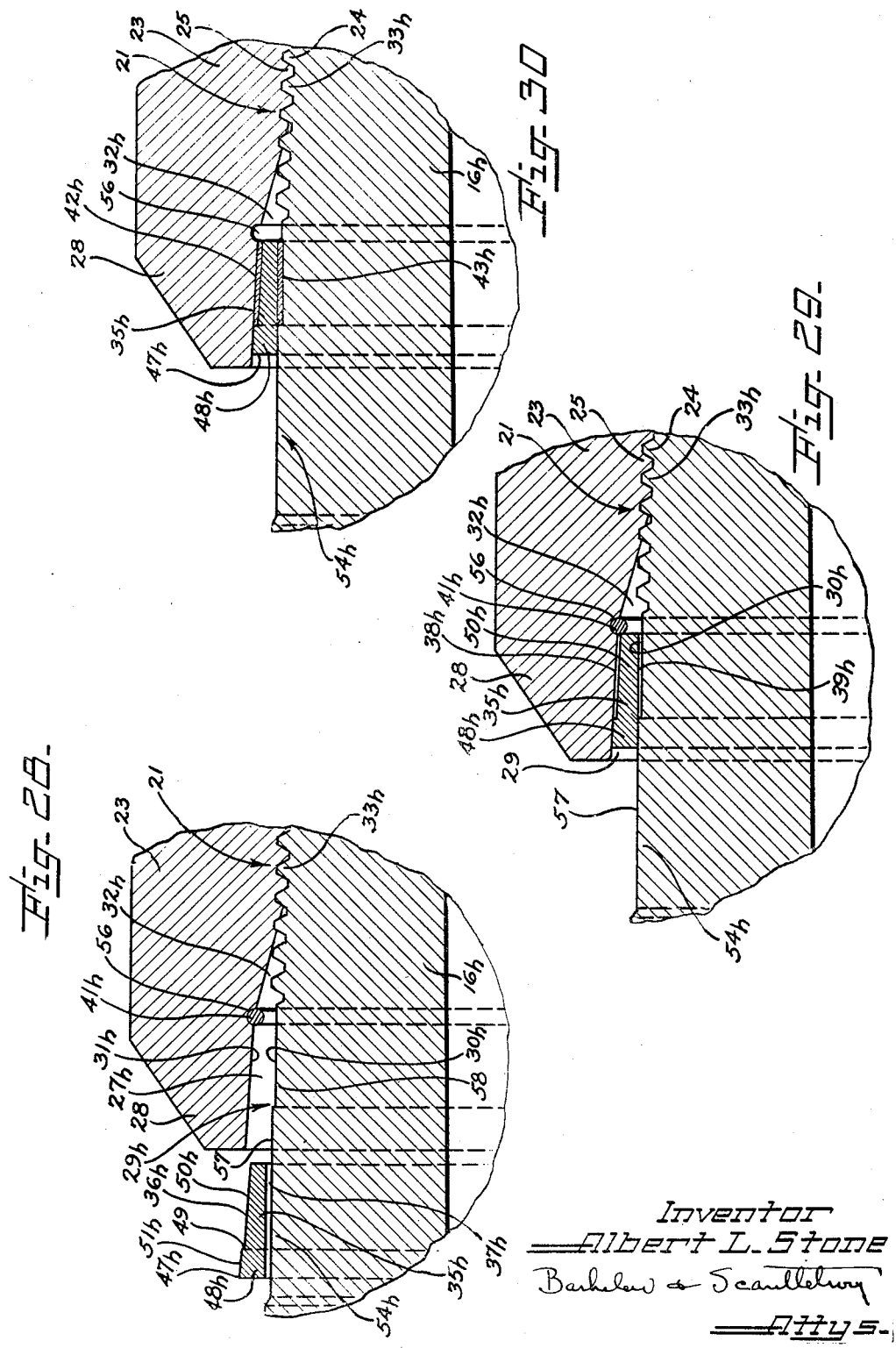

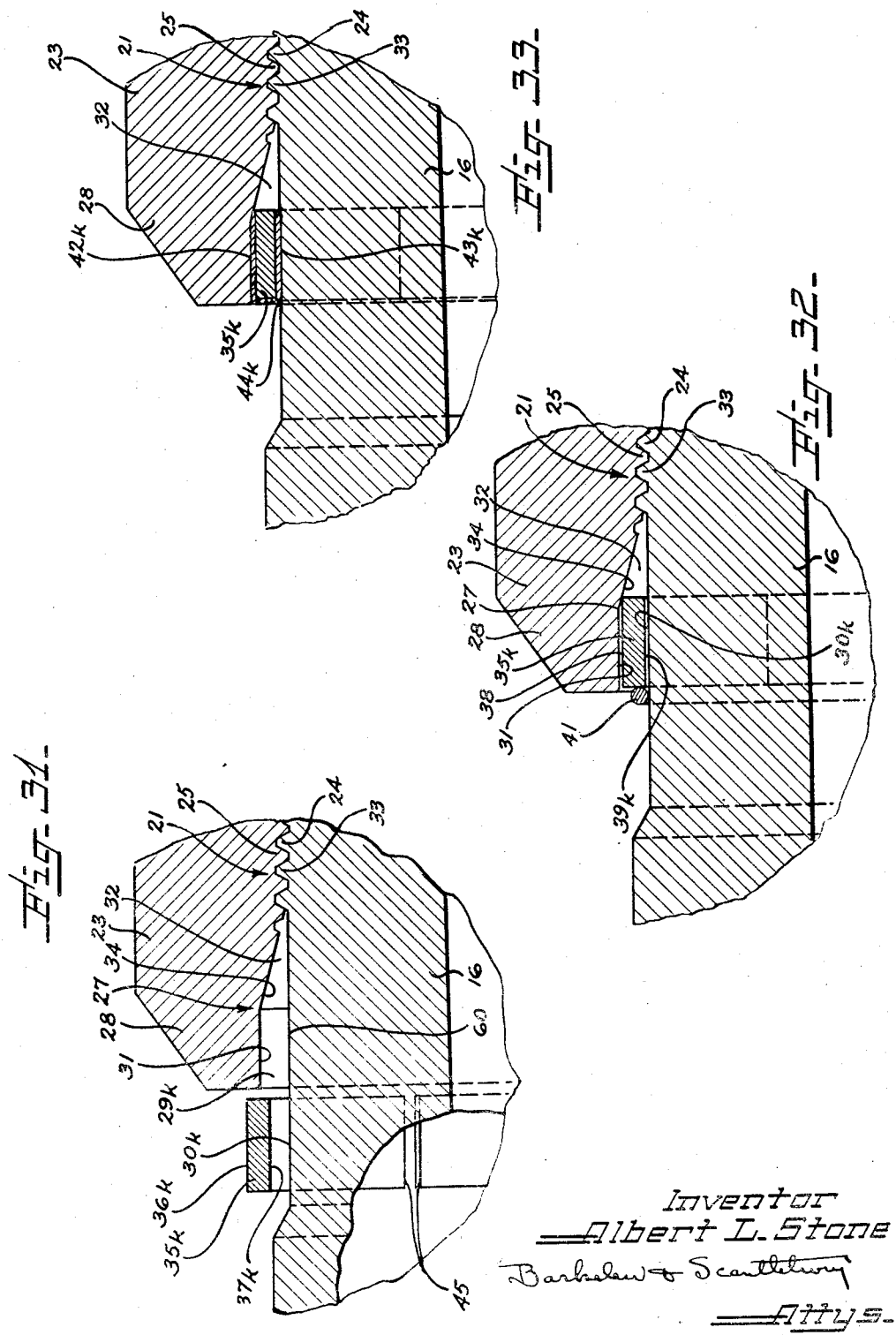

Patented May 22, 1951

2,553,836

UNITED STATES PATENT OFFICE 2,553,836

DRILL PIPE CONNECTION

Albert L. Stone, Palos Verdes Estates, Calif., assignor to Hydril Corporation, Los Angeles, Calif., a corporation of California Application September 17, 1945, Serial No. 616,739

6 Claims. (Cl. 285—146)

This invention relates generally to drill pipe connections and methods of making them, and is more particularly concerned with connections and methods involving the use of hard solder.

For the purpose of explaining my invention, I will describe it in connection with a joint employing a particular type of thread, but it will be understood that this choice is made for illustrative purposes only and is not to be considered as limitative on the invention.

A drill stem for boring oil wells and the like, ordinarily includes a series of "stands," each stand being made up, for instance, of several lengths of drill pipe which are more or less permanently connected by collar couplings. Between each stand is interposed a tool joint made up of a pair of members (one a box member and the other a pin member) having interengageable, quick-detachable threads, whereby it requires only a few turns to couple or uncouple them.

The box and pin members of a given pair are connected to the pipes at the opposing ends of adjacent stands, and the present invention may be applied with particular advantage to the connections between the pipes and joint members. I have therefore confined my illustrations and description to such an application. However, such confinement is not to be considered as indicating that the usefulness of the invention nor the appended claims are limited to the illustrated and described installations.

Each of the connections between the pipes and their associated tool joint members, is ordinarily in the form of interfitting, tapered threads (the taper being appreciably less than that of the quick-detachable connections mentioned above). It is important that these connections be made up tightly in order to seal against leakage due to the high differentials frequently existing between external and internal fluid pressures. The radial forces developed by tightly engaging the sealing surfaces and then exposing the joint to high torque loads during drilling operations, tend to split the box members and to collapse the pin members, and are thus the cause of frequent failures, it being remembered that the pin member is tapered and that the socket of the box member is complementary to the pin. The "creeping" of the threads under high torque loads and the relative "working" of the joint-parts under service conditions, particularly where initial looseness exists in the joint, are recognized as starting factors of ultimate failure.

In usual connections, the "last engaged thread" establishes the zone at which failure is most likely to occur. This is because it is about this thread, which represents a sharply defined annular groove in the pin member, that the joint members tend to "rock" relatively as the drill pipe bends during drilling operations. The valley of this last engaged thread represents a relatively weak zone, as it amounts to a "notch" which invites the initiation of rupture at this point. The relative rocking of the joint parts set up stresses and strains of fatigue at this relatively weakened zone, which are probably the most frequent causes of "twist-off" failures.

The box of an A. P. I. joint includes an unthreaded skirt that extends longitudinally outward beyond the last engaged thread, but this does not cure the situation spoken of above since the annular spacing of the skirt from the pipe is of a magnitude to allow a dangerous amount of "rocking."

It is therefore among the objects of the invention to provide a fluid-tight connection wherein the joint members are relatively immobilized so that there can be no accidental loosening of the threaded connection, no "creeping" of threads which might lead to box-splitting or pin collapse, and no initial looseness which might otherwise give opportunity for the joint to work. Further, it is an object of the invention to provide a connection wherein the point of "rock" does not exist at the last engaged thread, but, rather, is shifted longitudinally outward to an unthreaded part of the pin member where no rupture-inviting "notches" exist. It is a still further object of the invention to provide a connection wherein the joint members, while rigidly immobilized when the joint is in use, may be readily disconnected when occasion arises for the wilful breaking of the joint. However, after the joint has been so parted, it is in condition to be reconnected with its parts again relatively immobilized.

In my copending application Ser. No. 531,380, entitled Soldered Drill Pipe Connections and Method of Making Same, filed April 17, 1944, now abandoned, I have shown and described a connection and method wherein all the above objects are accomplished by the use of hard solder. In that application it is pointed out that the thickness of the solder bond is a critical factor; in fact, to give fully effective results the bond must be of uniform "capillary thickness." In one of the showings of that application, the width of the solder receiving space between joint members was established by the direct machining of opposed peripheral faces of the box and pin members at a point longitudinally outward of the mating threads, and, since the space was of capillary magnitude, this machining necessarily had to be of a relatively high degree of accuracy.

It is a particular object of the present invention to secure the benefits recited above without requiring the close-tolerance machining of the faces to be bonded, and thus not only make it possible to reduce the labor and cost of manufacture, but also to reduce the manufacturing problem to an extent that it may be practiced readily and profitably in the field, even though manufacturing facilities be relatively meager.

Generally, the present invention is adapted to situations where there is an annular space of considerable width, (that is, considerably greater than of capillary extent) between the pin and box at a point outwardly beyond the last engaged thread of the joint, whether this space be the result of original design or represents one of the initial steps of the present method. In carrying out the present method, it is only necessary that portions of the unthreaded peripheral faces of the pin and box members be substantially concentric with the pin and box threads, respectively, and that the annular space defined between said faces be of appreciably greater than capillary extent. Thus, the radially measured width of the space will be substantially uniform throughout its circumferential extent, but its dimensional value is not critical. To establish the critical, capillary spacing, I utilize a gage ring which, when inserted in the annular space, serves as a gage to establish, with opposing peripheral faces of the joint members, annular, solder-reception spaces of capillary width. Where conditions call for a bond of highest ultimate strength, the gage rings are so fashioned that it is assured that the space is of exactly uniform width throughout the circumference of the bond and throughout an appreciable longitudinal extent.

Thus the gage ring serves the purpose of establishing an annular solder-receiving space of predetermined critical width, regardless of the original spacing of the opposed peripheral faces of the box and pin members.

Upon bonding the ring and joint members by hard solder introduced to the capillary spaces created as above, the ring becomes, in effect, an integral part of the coupled joint, acting with the introduced solder, as a "filler" for the space originally existing between the joint members, and as an intermediate, integrating tie between said members.

The ring and introduced solder, in their "filling" function, serve to eliminate free, relative transverse movement of portions of the joint members, such as is possible at points where the members are annularly spaced apart. By filling the gap between joint members at a point outwardly beyond the last engaged thread, there is no tendency for the members to rock relatively about the zone of this last thread when the drill pipe is exposed to bending stresses and strains and, therefore, there is no likelihood of failure at this zone. Additionally, the soldered ring ties or integrates the joint members so that they effectively resist the tendencies arising from stresses of tension, compression and torque to loosen the threaded joint, to cause thread creep, and to create initial looseness which might otherwise develop into a tendency of the joint members to "work."

It is a distinguishing characteristic of the finished joint that the ring acts not only as a filler or shim, but also as an integral, rigid bridge between joint members, which is as fully effective to transmit drive from member to member and to prevent relative movement between the members as though those members were one.

Other objects and features of novelty will be apparent from the following detailed description, reference being made to the accompanying drawings, in which:

Fig. 1 is an elevation, partly in medial section, showing an embodiment of my invention applied to the tool joint of a drill pipe;

Fig. 2 is an enlarged, fragmentary view of one of the connections shown in Fig. 1 prior to its completion;

Fig. 3 is an enlarged fragmentary section corresponding to the zone A in Fig. 2, but illustrating a standard A. P. I. connection to which the gage ring of my invention has not yet been applied;

Fig. 4 is an enlarged fragmentary section corresponding to the zone A in Fig. 2, but additionally illustrating the initial application of a gage ring to the pin member of the joint;

Fig. 5 is a view similar to Fig. 4, but showing a later step of the method;

Fig. 6 is a view of the completed connection and represents a fragmentary enlargement of one of the connections shown in Fig. 1;

Fig. 7 is a reduced-scale section on line 7—7 of Fig. 6, but showing the connection in its complete, annular form;

Fig. 8 is a view similar to Fig. 4, but showing a different type of gage ring;

Fig. 9 is a reduced-scale section on line 9—9 of Fig. 8, but showing the joint member and gage ring in their complete, annular forms;

Figs. 10 and 11 are similar to Fig. 9, but showing variational gage rings;

Fig. 12 is a fragmentary perspective of the gage ring illustrated in Fig. 9;

Fig. 13 is a view similar to Fig. 8, but showing a later step in carrying out the method;

Fig. 14 is a view similar to Fig. 13, but showing the connection completed;

Figs. 15, 16 and 17 are similar to Figs. 8, 13 and 14, respectively, but showing different gage ring and counterbore formations;

Figs. 18, 19 and 20 are similar to Figs. 8, 13 and 14, respectively, but showing different gage ring and pin formations;

Fig. 21 is a view similar to Fig. 16, but showing a different gage ring and showing a different placement of the solder ring;

Fig. 22 is a fragmentary perspective of the gage ring shown in Fig. 21;

Fig. 23 is a view similar to Fig. 21, but showing the connection completed;

Fig. 24 is a view similar to Fig. 4, but showing the pin member of reduced diameter adjacent the threads, a relatively large initial clearance space between the gage ring and pin, and a conventional illustration of a ring-swaging means;

Fig. 25 is a reduced scale section on line 25—25 of Fig. 24 but showing the elements in their full annular form;

Fig. 26 is a view similar to Fig. 24 but showing the gage ring inserted within the box counterbore;

Fig. 27 is a view similar to Fig. 26, but showing the connection completed;

Fig. 28 is a view similar to Fig. 4, but showing variational pin, gage ring and counterbore formations;

Fig. 29 is a view similar to Fig. 28, but showing a subsequent step in the method;

Fig. 30 is a view similar to Fig. 29 but showing the connection completed;

Fig. 31 is a view similar to Fig. 3, but showing the pin member re-shaped, and a gage ring in its initial position on the pin member;

Fig. 32 is a view similar to Fig. 31, but showing a subsequent step in the method; and Fig. 33 is a view similar to Fig. 32 but showing the connection completed;

Before entering into a detailed discussion of the invention, I will make certain generalizations and reservations.

References to hard solder are to be considered as including the use of any solder or brazing material which requires a red heat to melt it, and references to soldering operations are to be considered as applying either to soldering or to brazing. It will be understood that whenever the bonding material is such that flux is necessary or desirable, the operation will include the use of a suitable flux, even though it be not specifically mentioned hereinafter, and that the flux is applied from the point of solder introduction to all points to which it is indicated the molten solder is to run.

"Capillary" width of a space is to be considered as representing a dimension which will permit or cause the feeding of solder therethrough by "capillary" action. For instance, the range between .0005" and .007" has been found satisfactory. On the average, a width of about .003" is preferred for the operation here to be described. A shoulder or flange height of "capillary" extent is to be considered as being of the same order of dimensions. These widths and heights are necessarily shown on greatly exaggerated scale in the drawings, for obvious reasons.

It will be understood that while the invention is especially well adapted to the connection of tool joint members to adjoining pipe sections, and is so illustrated and described, the invention and claims are to be considered as broadly contemplating the application of the method to any threaded connection between tubular members such as those making up a well pipe.

Fig. 1 illustrates a fragment of a drill stem or pipe string 10 made up of adjacent drill pipe sections 11 and 12 detachably coupled by the tool joint generally indicated at 13. Tool joint 13 comprises pin 14 and box member 15 which are, respectively, threadably connected to the internally upset ends 16 and 17 of pipes 11 and 12, respectively, though it will be understood the upsetting of the pipe ends, either internally or externally, is not at all controlling on the present invention.

Pin 18 of member 14 and box 19 of member 15 have a threaded connection at 20 which is of the quick-detachable type, the pin and box being relatively sharply tapered so it requires only a few turns of one member with relation to the other to couple or uncouple them. Tool joints are employed between adjacent "stands" of drill pipe, each "stand" normally being made up of a plurality of pipe sections.

Pipe sections 11 and 12 represent opposing sections of such adjacent "stands," and tool joint 13 represents a point at which the drill stem is separated into "stands," when coming out of the hole, and at which adjacent "stands" are connected into the stem when going into the hole.

The joints 21 and 22 between pipe sections 11, 12 and members 14, 15, respectively, represent examples of connections to which my invention may be applied with particular advantage, though the invention is not at all limited thereto. Such connections are ordinarily intended to be permanent ones, at least until necessity arises for replacing the tool joints. Such permanence is secured, in the present instance, by a hard-soldered bond. When occasion arises for breaking the connection, it requires only that the bond be heated to solder-flow temperature to insure that the subsequent unthreading operation may be accomplished without causing damage to the joint members or pipe sections, including the coupling threads.

Joints or connections 21 and 22 are similar and therefore I will describe only one of them in detail. While I will refer to particular characteristics of the threads, this is done for illustrative purposes, only, and is not to be considered as limitative, for the invention is used to advantage irrespective of the nature of the threads. Connection 21 will hereinafter be referred to as being between the "pin" member represented by pipe terminal 16 (whether or not it be upset) and the "box" member represented by the collar portion 23 of the tool-joint member 14. Members 16 and 23 have mating, tapered threads 24 and 25, the taper being, for instance, about 2°, on the axis, as compared with the taper of about 7°, on the axis, of thread 20, though, again, such degrees of taper are not to be considered as limitative on the invention.

For purposes of explaining certain characteristics of a usual connection between pipe and tool joint members and to lay the basis for later reference to a particular embodiment of the invention, reference will first be made to Fig. 3, wherein there is illustrated a standard A. P. I. connection and to which the description, so far given, applies fully.

The thread cutting operation results in the gradual dying out of the pin threads, as at 26. Box member 23 is cylindrically counterbored at 27 to provide a skirt 28 which is annularly spaced from, but extends longitudinally over, the "die-out" of the thread. Thus, space 29 is annularly defined by the opposed peripheral faces 30 and 31 of the pin and box members, respectively. Tapered counterbore 32 extends inwardly from counterbore 27 to the bore of the box in a manner to cause the last two or three threads of the box member also to "die-out," it resulting that pin thread 33 normally represents the "last" fully-engaged thread of the pin member.

Since there is no positive stop for limiting the extent to which the box and pin members are screwed together, the imposition of heavy torque loads on the drill stem during drilling operations tends to cause "thread-creep," which, due to the tapered nature of the box and pin members, often result in radial collapse of the pin member or splitting of the box member. Furthermore, due to the annular clearance existing between the pin and box members at a point outwardly beyond thread 33, said thread represents the "rock point" or location about which the joint members tend to rock relatively as the drill pipe bends during drilling operations. The consequent concentration of stresses and strain of fatigue at this zone, where the last engaged thread introduces the factor of "notch sensitivity," is a frequent cause of pipe-rupture.

In my co-pending application, identified above, it is pointed out that by immobilizing the joint parts through a hard solder bond at the free end of the box member, the above objectionable results are avoided. However, as stressed in that application, the solder-bond must not be of greater than "capillary" thickness if the necessary joint-strength is to be obtained. Obviously, therefore, a hard-solder bond having a thickness equal to the radially measured width of space 29 will not do—for such space is normally about $\frac{1}{16}''$ wide where the pipe 11 is of 4½'' outside diameter. In all standard A. P. I. joints the spaces corresponding to 29 are of greater than "capillary" width.

Later, in connection with Figs. 31 through 33, I will describe how I adapt my method to the soldering of a joint initially having the characteristics of Fig. 3, but I will now proceed to the description of my method as applied in a situation where the box member of the connection is fashioned so it does not follow the A. P. I. standard insofar as the annular skirt and the counterbore are concerned.

Reference will first be made to Figs. 1, 2 and 4 through 7. Throughout the remainder of the specification, exactly corresponding parts of the several illustrated variational embodiments of the invention will be given the same reference numerals, while parts which correspond generally but have individually different detail characteristics will be given the same reference numerals followed by individual letter-indicia. This is done to avoid the necessity of repetitive description.

In Figs. 2 and 4 the pin member 16 and its threads 24 may be the same as the corresponding parts of Fig. 3, it being assumed that threads 24 are concentric with peripheral face 30 and that the latter is in solder-receptive condition or may be made so by merely cleaning it off. Box member 23a is generally similar to box 23, and its thread 25 may correspond exactly to the box thread of Fig. 3, but counterbore 27a is of greater diameter than is counterbore 27, so space 29a is, for example, about twice as wide, measured radially, as is space 29, though this particular relative dimension is not to be considered as limitative. Preferably, also, skirt 28a is longer than skirt 28, thus adding in effect, to the depth of the counterbore 27a and to the longitudinal extent of the zone in which peripheral face 31a radially opposes an unthreaded extent of the peripheral face 30 of the pin member.

It is not necessary that counterbore 27a be machined to any exact diameter, but it is quite important that peripheral face 31a be concentric with box threads 25. With this condition of concentricity existing, and since it has been specified that face 30 is concentric with pin thread 24, it is assured that, when threads 24 and 25 are properly mated, faces 30 and 31a are concentric and space 29a is of uniform width throughout its annular extent.

Though the opposed faces of the pin and box members may be machined to have precise relative dimensions, as may also the gage ring (to be described) to allow for universal interchangeability, my method is such that this degree of precision is not necessary and it is thus adapted to field operations where talent and precise machining equipment may not be available. Therefore, I will describe the remaining operations as though there were no attempt at interchangeability—without inferring thereby that the more precise relative dimensioning falls without the scope of the invention.

It may be assumed, for the purpose of illustration, that a given pair of box and pipe members is chosen at random from stock without regard to their precise dimensions, but with the knowledge that the manufacture was such as to insure that the specified concentricity exists and that the space 29a, which is to be developed after the members are threadably connected, will be of ample, radially-measured width to take, with requisite annular clearance, one of the stocked gage rings 35a. These rings are made of any suitable metal though, for most purposes, I prefer to use steel having a yield strength of 40,000 lbs. or more. These rings may be provided and stocked in various thicknesses and diameters and may be continuous, split, or segmental.

The operator measures the diameter of the counterbore 27a of the chosen box and the outside diameter of the chosen pin 16 at face 30. From these measurements he determines the width of the space 29a which will be developed when the members are mated, and he selects a ring 35a which has such thickness, measured radially, as will be received in that particular space and leave annular clearance spaces of uniform capillary extent between the ring and the opposing peripheral faces of the box and pin members. For instance, if the pin face 30 measures 4.5'' in diameter and the counterbore measures 4.75'' in diameter, he may select a gage ring which is 4.506'' inside diameter and 4.744'' outside diameter. Such a ring will, when centered within space 29a, provide an annular, solder-receiving space (.003'' wide, as measured radially) between the outer peripheral face 36 of the ring and the face 31a of the counterbore, and a solder-receiving space of like capillary dimensions between the inner peripheral face 37 of the ring and the peripheral face 30 of the pin.

As noted above, ring 35a may be continuous or it may be split, as indicated in Fig. 7, in which latter case the free end or ends of a ring of given thickness and given initial diameter, may be filed or otherwise dressed at the split to reduce the effective diameter of the ring and thus make it possible to adapt the single ring to different joint-pairs, where the differentials between the pin and box diameters, at the zone of spaces 29a, are the same in the different joint-pairs, but, as between pairs, the individual diameters vary. The rings, split or unsplit, are so formed that they are truly round when they are finally inserted in spaces 29a. Rings of the split type may conveniently be rolled to shape from flat material such as gage, shim or flat-ground stock, for such material comes in a relatively large number of accurately gaged thickness dimensions.

Fig. 4 shows ring 35a encircling pipe end 16, but before it has been thrust into space 29a, the ring having been slipped over end 16 before connection 21 was made up. Fig. 5 shows ring 35a as moved forwardly into place within the recess 29a, the capillary spaces between the ring and box member and between the ring and pin member being indicated at 38 and 39, respectively. The ring may be inserted to an extent determined by the contact of its inner end with the wall 34a of conical counterbore 32a, and, preferably, though not necessarily, the outer end of the ring is spaced inwardly from the free end of skirt 28 to form an annular pocket 40.

In its broader aspects, my invention contemplates any suitable procedure for introducing hard solder to spaces 38 and 39 and, with this solder, creating a rigid bond between the ring and the joint members. I have illustrated and will now describe, in connection with the presently selected embodiment of the invention, certain preferred procedures, but these references to particularities are not to be considered as limitative on my broader claims.

It is also to be understood that any procedure or step described in connection with one embodiment may be substituted for the corresponding procedure or step described in connection with any other embodiment, so long as they are not precluded by the individual characteristics of such other embodiments. For instance, while in the embodiment of Figs. 5, 21, 26 and 32, the solder is described as introduced from the outer end of the gage ring, it is within the scope of the invention to introduce the solder from the inner ends of the rings in said figures—for instance, as illustrated in Fig. 13. In general, characteristics of procedure or results which are inherently possible or consummated in carrying out any given embodiment, though described in connection with another embodiment, are to be considered to be applied to said given embodiment.

In Fig. 5, one or more rings 41 and 41' of hard solder wire are placed in pocket 40 after gage ring 35a and walls 31a, 32 have been properly fluxed, the wire being of a gage to provide, in molten state, an ample amount of solder to fill spaces 38 and 39, plus a proper allowance for wastage. While the axial positioning of the joint assembly is not critical during the soldering operation, since capillary action will draw the solder into spaces 38 and 39 even though the joint axis be horizontal, it is preferable that the joint axis be vertical and that the solder ring 40 be uppermost. This generalization, as to axis-position during the soldering operation, is to be considered as applied to the variational embodiments later to be described.

In threadably coupling the joint members, the box member may be heated to expand it sufficiently to enable it to be easily threaded home, the threaded joint tightening up by subsequent shrinkage when the box cools.

With the joint arranged with its axis vertical and with the inner end of ring 35a engaged with the tapered defining wall 34a of conical counterbore 32a, the ring will be self-centered within the cylindrical counterbore 27a, it following that the radially measured, capillary width of spaces 38 and 39 will be uniform throughout their annular extents.

With the elements arranged in the relative positions of Fig. 5, skirt 28a, ring 35a and the zone of pin 16 defined by face 30, are raised to solder-flow temperature. This may be accomplished by any suitable heating means such as a torch, though preferably the heating procedure outlined in my said co-pending application is followed. This procedure involves the use of induction coil heating from either the inside or outside of the joint, which procedure has the advantage of giving rapid, easily controlled and localized heating effects. Where it is important that exposed portions of the box and pin members, particularly in the transverse plane of the ring 35a, be kept from reaching solder-flow temperature because it is desirable not to disturb the metallurgical characteristics given those portions by pre-heat treatment, the localized cooling described in said application may be used to advantage.

As soon as solder-flow temperature is reached, capillary action causes molten solder from pocket 40 to enter and extend itself through spaces 38 and 39, as illustrated at 42 and 43, respectively, in Figs. 6 and 7.

Due to the described relative dimensioning of the joint members and the ring and the described centering of the ring within space 29a, the solder bodies 42 and 43 will be of uniform capillary thickness throughout their annular extends. In the event the conical shoulder such as the defining wall of counterbore 32a be not used for self-centering the ring, or if no other mechanical centering means be used, the molten solder has a tendency to "float" the ring into centered relation with the pin and box, and therefore the ultimate solder bonds will be sufficiently close to uniform thickness to possess strength characteristics suitable for many types of work. However it is preferable, particularly where the joint is to present maximum strength characteristics, that uniformity of bond thickness be assured by a positive centering of the ring within space 29a.

Upon subsequent cooling of the elements, solder bodies 42 and 43 form bonds of uniform capillary thickness between the pin member, ring, and box member, and, of course, the solder integrates the free ends 45 of the ring if a split ring has been chosen for the particular installation. Solder bonds 42 and 43 not only provide a leak-proof connection between the pin and box members, but they so immobilize these members with relation to one another as to eliminate loosenesses which otherwise would allow "working" of the joint parts, and to prevent thread creep under the most severe torque loads. The bond thus eliminates one of the chief sources of pin collapse and box rupture, as well as other usual causes of joint-failure—all as pointed out in the earlier part of the specification. It will be noted that ring 35a, having served its purpose as a gage to determine the bond thickness during the soldering operation, now acts as a rigid bridge between and integrated with the pin and box members, being as fully effective to transmit drive from member to member and to prevent relative longitudinal and relative angular movement between the members as though those members were one.

Further, the bonded ring 35a acts as a filler for the original annular gap between the pin and box members at a point outwardly beyond the "last engaged" thread 33, and thus prevents the members from rocking relatively about the zone of this "last-engaged" thread when the drill pipe is exposed to bending stresses. In so acting, the ring eliminates another of the chief causes of drill stem failure, for the rock point is shifted to a location (the outer end of ring 35a) on pipe-end 16 where there is no "notch effect." Furthermore, solder fillet 44 merges into peripheral face 30, eliminating all abrupt and sharp shoulders at the junction of the ring and pin member and therefore greatly reducing the tendency of the ring to impose weakening stresses at this new point of rock.

In spite of the fact that the described solder-bonded connection is of a nature to resist effectively all forces tending to separate the joint parts during drilling operations, the joint may be broken wilfully when an occasion arises for removing a given tool joint member from a given pipe, without the danger of injuring any of the joint parts, including the threads. This may be accomplished by reheating the joint parts at the zone of bond to solder-flow temperature and then unscrewing the joint while the solder is molten.

I will now describe the embodiment of the invention illustrated in Figs. 8 through 14. In this case the gage ring carries a formation which, in its co-action with the opposing walls of the joint members, positively insures uniformity of the capillary spaces throughout their annular extents, it following that the ultimate solder bonds are likewise of uniform capillary thickness and therefore have maximum strength characteristics. The peripheral face 30 of pin end 16 is concentric with pin threads 24, while box end 23b is similar to end 23a, except that preferably skirt 28b and space 29b are slightly longer than skirt 28a and space 29a, respectively. The peripheral face 31b, defining counterbore 27b, is true and is concentric with box threads 25.

Ring 35b, which may be slipped over pin 16 before the joint is threadably coupled, has at one end an internal annular flange 46 and an external annular flange 47, the flanges forming, with the radially aligned portion of the ring, proper, an enlarged, annular head 48. Flanges 46 and 47 form annular shoulders 49 and 49' which are each of capillary extent, as measured radially of the ring. The body portion 50 of the ring is of uniform thickness throughout its annular and axial extents, and its peripheral faces are concentric with the peripheral faces of flanges 46 and 47. Gage rings having various diameters and various head thicknesses are manufactured and stocked, but in every case shoulders 49 are of capillary radial extent. It follows that while the head thicknesses and the thicknesses of body portions 50 may vary as between different rings, the differential between the head thickness and body portion thickness will exist substantially as a constant.

Having chosen at random a pipe member and a box member, the operator measures the inside diameter of counterbore 27b and the outside diameter of the pipe at pin face 30, and from these dimensions he selects a ring 35b whose head 48 has such inside and outside dimensions as will cause it to fit snugly into space 29b when the pin and box members are subsequently threadably coupled, and the selected ring is slipped onto the pin member, as in Fig. 8, prior to the coupling of the joint, the inner peripheral face of the head or flange 46 having close fit with pin face 30.

Ring 35b may be fashioned in any suitable manner, and it may be continuous, as in Fig. 9; split as at 35bb in Fig. 10; or segmental as at 35bbb in Fig. 11. In this connection, the same generalization as to ring formation is to be considered as applying to the rings later to be described and to the appended claims, except where the structural environment of particular embodiments or the phraseology of particular claims precludes such application.

Where ring 35b is of continuous nature, as in Fig. 9, it may be machined to size and shape from plain tubular stock, or it may be formed by processing plain tubular stock in a cold upsetting die. Where the ring is split, as in Fig. 10, or is segmental, as in Fig. 11, it may be curved to shape after having been cut from flat stock which has been preliminarily formed to give it the described cross-sectional characteristics.

After having inserted the ring 41 of hard solder in the counterbore 27b and after the joint parts have been screwed together, the gage ring is thrust into space 29b (Fig. 13) head 48 preferably having snug fit within that space. Due to the described cross sectional characteristics of the ring, it is assured that annular spaces 38b and 39b are of uniform capillary widths throughout their longitudinal and annular extent. If the ring be initially somewhat out of round, the fitting of head 48 over the pin end will true up the entire ring. It will be noted that the assurance of uniform, capillary widths is had in spite of the fact that peripheral faces 30 and 31b were not necessarily originally machined to have precise relative diameters. Thus, the operator in the field is able to secure precisely accurate final results without having to perform any precise machining operations and without it being required that the pipe member and box member he has selected possess any particular relative dimensioning of the box counterbore and the portion of the pin to be taken within that bore. The basis of the ultimate precise sizing, which is essential to secure the highest ultimate strength of the soldered connection, is the accurate relative dimensioning and arrangement of the body and flange portions of the gage ring. Since these rings come to the field in accurate form from plants where the requisite accuracy is easily accomplished, they represent no machining problem to the field installer.

With the elements in the condition of Fig. 13, the soldering operation is carried out as described in connection with Figs. 6 and 8, giving the final effect of Fig. 14, where the solder has entered the spaces 38b and 39b by capillary action and, when cooled, has formed the solder bonds 42b and 43b which are of uniform capillary thickness throughout their annular and axial extents, giving all the beneficial results spoken of in connection with Fig. 8, plus the added benefits arising from the positive exactness of the uniformity of bond thickness, which uniformity has been positively assured by reason of the described ring formation as distinguished from the plain ring of Fig. 6.

During the soldering operation, the joint is preferably positioned vertically, with solder ring 41 uppermost. However, should the joint extend horizontally during the soldering operation, the solder may be prevented from flowing into the counterbore 32b instead of into spaces 38b and 39b, by proper heat control. That is, localized heating and cooling may be established, as described in my aforesaid application, so ring 35b solder 41 and the adjacent, co-planar portions of members 23b and 16 are heated to solder-flow temperatures, while the portions of members 23b and 16 which lie to the right of solder ring 41 (as viewed in Fig. 13) are held below this temperature.

In the embodiment of Figs. 15 through 17, the same general principles are employed as in Figs. 8 through 14, except that the ring and counterbore formations are such that the inside and outside diameters of the gage ring head need not be of closely accurate dimensions in order to be taken properly within a given annular space existing between the pin and box member of a given joint-pair. The number of different sized stock rings necessary to insure that there will be one to fit any given pair of stock pin and box members, is thus materially reduced.

The formation of counterbore 27c differs from that of counterbore 27b in that the latter is cylindrical while 27c is conical. Ring head 48c and body portion 50c are externally conical, the taper of counterbore wall 31c being of the same degree as the taper of the peripheral face 36c of body portion 50c and the taper of peripheral face 51 of flange 47c. However, external shoulder 49, as well as internal shoulder 49', is of capillary extent, measured radially, and, considered in a transverse cross sectional plane, face 36c of body portion 50c is parallel to the peripheral face 51 of external flange 47c. When given box and pin members have been chosen, the operator selects a ring 35c whose head 48c will fit space 29c at any point which will insure the proper longitudinal positioning of the body portion 50c within the space. The inside diameter of the head must be at least as great as the outside diameter of pin 16 at face 30 and the outside diameter of the head must be sufficiently small to enter the relatively wide mouth of opening 29c, but between these limits the ring diameters may vary appreciably and still be adaptable for the purpose.

Suppose, for instance, that the internal flange 46 of a selected ring fits the pin nicely. The ring is merely thrust into opening 29c until the external flange 47c engages counterbore wall 31c, and, by pressing the ring head firmly to seat, the tapered faces 51 and 31c will thereafter co-act to hold the ring in a position to insure the spaces 38c and 39c (Fig. 16) are of capillary widths. On the other hand, if flange 46 has loose fit about pin 16, the ring is forcibly thrust home after tapered faces 51 and 31c engage, the resulting wedge or swaging effect radially contracting the ring to diminish the inside diameter of head 48c until internal flange 46 peripherally engages pin face 30 (Fig. 16) thus insuring that spaces 38c and 39c are individually of uniform capillary width in spite of the fact that originally the internal flange was annularly spaced from the pin. Or, if the oversize ring be originally split, with the split ends spaced apart when first applied to the pin, the wedge action between the tapered faces of the head and counterbore wall will radially collapse the ring about the pin, and the split ends of the ring will be drawn toward one another.

The hard solder ring 41 is applied and the soldering operation is carried out as described in connection with Figs. 13 and 14, the final result being that represented in Fig. 17 wherein the solder bonds 42c and 43c are shown to be individually of capillary thickness throughout their annular and longitudinal extents, with all the attendant advantages.

The embodiment of Figs. 18 to 20 illustrates a situation wherein the pin end 16d has a conical external upset 52, the taper of peripheral face 30d being complementary to that of wall 31d of counterbore 27d. It follows that when pin 16d and box 23d are threadably mated, as in Fig. 20, annular space 29d is of uniform width throughout its longitudinal extent, though its bounding walls are conical. The peripheral face 51d of head 48d or flange 47d is complementary to face 31d, and the peripheral face 53 of head 48d or flange 46d is complementary to pin face 30d. Faces 36d and 37d of body portion 50d are parallel and have the same taper as faces 51d and 53d. As in the previous cases, shoulders 49 and 49' are of capillary extent, measured radially.

The operator choses a ring 35d whose head 48d will snugly fit space 29d when the joint is subsequently made up, and he slips this ring onto pin 16d prior to threadably mating the pin and box members. Preferably, the conical ring is moved to the position it will finally occupy on the pin (Fig. 18) as determined by the full engagement of conical face 53d with conical face 30d. After applying hard solder ring 41 to the pin, box 23d is screwed home on pin 16d, and skirt 28d will move over ring 35d to the position of Fig. 19, at which time conical head face 51d will be engaged by conical face 31d. In some instances, the method is most advantageously carried out by selecting parts having such relative dimensions, that as the box member shrinks about the pin member, the shrink causes face 31d to tightly engage ring face 51d. As before, capillary spaces 38d and 39d, of individually uniform widths throughout their annular and longitudinal extents, will be defined by opposed peripheral faces of the ring and joint members. The soldering operation is then carried out as previously described, and the final result is that illustrated in Fig. 20, wherein solder bonds 42d and 43d are of capillary thickness and integrate the joint parts with all the beneficial effects mentioned in connection with the previously described joints.

In the embodiment illlustrated in Figs. 21 to 23, the pin member 16 and counterbore 27c have the same characteristics as the corresponding parts in Fig. 15, the peripheral face of the pin being cylindrical and the peripheral face 31c of the counterbore being conical. In this case, however, head 48f is provided at the smaller end of the external taper of gage ring 35f (Fig. 22). Cylindrical faces 37f and 53f are concentric, the latter defining a bore adapted to take pin 16. Conical faces 36f, 51f and 31c have the same degree of taper, the ring head 48f having such outside diameter that it will engage counterbore wall 31c when moved to proper position within the annular space 29c after the joint parts have been mated as in Fig. 21. It will be noted that everything said as to the fitting of ring 35c within conical counterbore 27c of Figs. 15 to 17, applies also to the fitting of ring 35f within the associated counterbore.

Fig. 21 illustrates gage ring 37f in position for soldering, the capillary spaces 38f and 39f possessing the characteristics ascribed to the previous embodiments except that, as distinguished from Figs. 13, 16 and 19, they open to pocket 40 wherein the solder ring 41 is placed. The soldering procedure may be the same as that described in connection with Figs. 5 and 6, resulting in bonds 42f and 43f of capillary and individually uniform thickness (Fig. 23) and giving to the completed joint all of the advantageous characteristics mentioned above.

The provision of head 48f at the inner end of the gage ring has the advantage of providing a stop or dam for preventing solder flow into counterbore 32c, thus eliminating solder wastage and insuring that the spaces 38f and 39f are filled with solder even though the defining walls of counterbore 32c be heated to solder flow temperature. It also allows the formation of a solder fillet 44f at the outer end of the ring, thereby eliminating an abrupt shoulder between the gage ring and pin at this "rock point." It will be understood that it lies within the scope of my invention to provide this feature of a head at the inner end of the ring in substitution for the heads at the outer ends of the rings illustrated in connection with the other embodiments.

The embodiment shown in Figs. 24 through 27 is especially well adapted to a situation where the zone of the pipe or pin member which is to be taken within the box skirt, requires machining to put it into proper solder-receptive condition or to render it truly concentric with the pin threads. However, it broadly contemplates any situation where the zone of the pin which is to be encircled by the box skirt is of lesser diameter than are the thread crests of the pin.

The box and counterbore formations may be exactly the same as in Fig. 4, and therefore need be no further described. However, pin end 16g is turned or ground down to product a zone of reduced external diameter, circumferentially bounded by peripheral face 30g which is truly concentric with pin threads 24. The turning operation will ordinarily remove most or all of the original "die-out" threads of the pin and may even include one or more of the adjacent full pin threads.

A ring 35g is then chosen which has the proper thickness characteristics to enter space 29g and leave the described solder-receptive clearance spaces. Since the outside diameter of zone 54 is less than the crest diameter of threads 24, it is impossible to use a continuous gage ring having an initial internal diameter which is greater than the diameter of face 30g by only capillary extent, unless special steps are taken. While a split ring or segmental ring having proper dimensional characteristics may be applied to the reduced-diameter zone, as will be readily understood and as is contemplated as included in this embodiment of the invention, Figs 24 to 27 also illustrate a method of employing a continuous, radially deformable ring 35g in the described situation.

If ring 35g be of the continuous type, it is chosen not only to have the thickness characteristics specified above but also to have an inside diameter which will enable it to be slipped over the pin threads to the position of Fig. 24. Then, before or after box member 23a is threadably connected to the pin, a radial swaging device, conventionally illustrated at 55 in Figs. 24 and 25, is applied to the ring and is operated to deform or contract the ring radially to an extent that it may be subsequently thrust into space 29g and leave the required capillary spaces 38g and 39g (Fig. 26).

If the ring be made of a metal having no appreciable resilient characteristics, the swaging device will be operated to exert its contractive force only to such an extent that the inner face of the ring is properly annularly spaced from face 30g, and such an operation is within the scope of my invention.

On the other hand, if the ring be of resilient material, it will tend to spring radially outward as soon as it is relieved from the compressive force of the swage. I take advantage of this characteristic as a particular feature of one embodiment of my invention, as follows. I choose a ring-metal which has such characteristics that, after the ring is swaged down to meet face 30g (the pin thus acting as a positive stop or sizing mandrel), and the swaging pressure is subsequently relieved, the ring metal will spring radially outward to an extent which will leave an annular space of predetermined, uniform capillary width between it and peripheral face 30g. This eliminates the necessity of checking the swaging operation at the precise instant a capillary spacing exists between the ring and pin, as is true where the swaging operation is depended upon to contract the ring to its final size.

For instance, assume the diameter of pin 16g is 4.4375" at zone 54 and that space 29g is .125" wide. A ring 35g is made up of steel having a yield strength of 40,000 lbs., the ring having an inside diameter of 4.5625" and an outside diameter of 4.8005". This ring is slipped over the pin to the position of Fig. 24 and swage 55 is operated to contract or deform the ring radially until it engages peripheral face 30g. When the swage is subsequently backed away from the work, the ring, because of its ascribed characteristics, expands radially a precalculable extent, namely, to an inside diameter of 4.4435". Then, when the ring is thrust into space 29g, there will be found to exist the desired, radially measured, annular spaces of .003" between the ring and pin and between the ring and counterbore 31g (Fig. 26).

Thus, with available knowledge of the springback characteristics of various metals, the operator may select the particular ring-metal which will give to the ring the final dimensional characteristics necessary to the given relative dimensional characteristics of the chosen pin and box members, and then merely swage the ring down to the pin, with the assurance that when the swage is removed from the work, the proper relative dimensions of ring and joint members will exist.

It will be understood that the described swaging operation may be advantageously applied in connection with any of the previously or hereinafter described embodiments wherein a continuous type of ring is employed, providing the ring be of the proper thickness and initially have an inside diameter which clears the peripheral face of the pin by more than capillary extent.

With the joint elements and solder ring 41 in the condition of Fig. 26, the soldering operation may proceed as described in connection with the previous figures, the final effect being that illustrated in Fig. 27 wherein the ring and the solder bonds 42 and 43 have the same characteristics and beneficial results as those described in connection with Fig. 6.

In the embodiment illustrated in Figs. 28 through 30, I have shown a situation wherein only the external flange is employed on the gage ring, the inner capillary space being gaged by establishing a predetermined, reduced diameter zone on the pin member of the joint.

In this case, counterbore 27h may have the general characteristics of counterbore 27c (Fig. 15) except that as a feature which may be incorporated in this or any other of the embodiments (though not necessary to this or any other such embodiment) an annular groove or solder reservoir 56 may be cut at the junction of counterbore 27h and 32h to receive and hold the solder ring 41h.

Ring 35h has only one flange, namely, the external flange 47h, the taper of whose external face 51h has the same degree of taper as counterbore wall 31h and as the peripheral face 36h of body portion 50h. On the other hand, the bore of ring 34h is of uniform diameter throughout its axial extent. Zone 54h is of reduced diameter, as in the case of zone 54 in Fig. 24, and is concentric with pin threads 24.

Peripheral face 57 of zone 54h extends to a point which is spaced inwardly from the mouth of counterbore 27h when the joint is made up. At the inner end of zone 54h, the pin is turned down to provide a zone 58 of still further reduced diameter, this zone being peripherally defined by cylindrical face 30h. Shoulder 59 at the junction of zones 54h and 58, is of capillary radial extent.

In making up the joints represented by this embodiment of the invention, a ring 35h is chosen which has the proper thickness characteristics to fit the given pin and box pair, as has been generally described in connection with the other embodiments and as more particularly described in connection with Figs. 15 to 17 wherein the counterbore and external ring flange are tapered. With solder ring 41 within groove 56 and with ring 35h encircling zone 54h, the joint is threadably made up as in Fig. 28. Ring 35h is then thrust toward the position of Fig. 29 until head 48h is tightly fitted within space 29h, the wedge coaction of faces 31h and 51h during the movement of the ring serving to contract the ring radially until the outer end portion of face 37h engages pin face 57h, and the remainder of ring face 37h is radially spaced from pin face 30h by capillary extent, as at 39h. If the selected ring 35h originally has sufficiently close fit on zone 54h, the wedge coaction of faces 31h and 51h may be utilized solely for establishing the final position of the ring within space 28h.

When the joint is exposed to soldering temperatures, as described in connection with the earlier embodiments, the solder of ring 41h will flow into capillary spaces 38h and 39h to form solder bonds 42h and 43h (Fig. 30) of uniform, capillary thickness, all to the advantageous ends spoken of above.

The embodiment illustrated in Figs. 31 to 33 is particularly well adapted to treatment of standard A. P. I. joints, as illustrated in Fig. 3, where it is desired to preserve the standard characteristics of the box member 23 and to do all machining work, if any be required, on the pin member 16, it being assured as a matter of standard practice that every counterbore 27 is concentric with its associated box threads 25. The gage rings may be of standard dimensions when it is planned to machine all pin members of a given stock to given dimensions, or the rings may be stocked in a variety of dimensions where it is possible that the machining may vary as between individual pin members. Of course, the above general treatment does not at all preclude the provision or fabrication of a special gage ring to suit the requirements of any particular given box and pin pair, and such special provision or fabrication lies within the scope of my claims.

The pin 16 of Fig. 3 is preferably turned down as in Fig. 31 to provide a zone 60 of reduced diameter, the cylindrical face 30k of this zone being concentric with relation to pin threads 24, and said face or zone may have a diameter substantially equal to the root diameter of the full pin threads. With given ultimate strength requirements, the cut producing zone 60 will be sufficiently deep to insure that, when the joint parts are mated, there will be an ample longitudinal extent of unthreaded pin surface encircled by skirt 28, to provide a proper solder receiving space between the gage ring and pin. It is to be borne in mind, however, that there are occasions where the strength demands are sufficiently low that the normal, unthreaded extent of the pin encircled by the skirt, as in Fig. 3, is sufficient to serve the purpose, in which case a relatively short and thin gage ring may be used and the procedure described in connection with Figs. 4 to 6 may be followed.

After reduced-diameter zone 60 is formed, a ring 35k is chosen which will fit, with described capillary clearance, a particular pin 16 and a standard box 23. The ring may be of any of the types previously described so long as it is capable of being initially applied to a pin zone which is of less diameter than the crests of the pin threads. If the ring be of the continuous type, it may be swaged to size, as described in connection with Figs. 24 and 25. If it be of the split type shown in Fig. 31, it will be sprung radially sufficiently to allow it to clear the pin threads as it is moved to the position of that figure. When it springs back or is otherwise radially contracted to an extent causing split ends 45 to meet, it will be assured that it has the characteristics proper to give the desired capillary clearance effects during the later steps of the process.

In Fig. 32 the ring is illustrated as being in its condition of final radial contraction and as having been thrust into annular space 29k, the ring being centered within counterbore 27 by the contact of the inner end of the ring with face 34 of conical counterbore 32, it thus being assured that spaces 38 and 39k are of uniform capillary width throughout their annular and axial extents. Or, as explained earlier, if no positive centering means be employed, the "floating" effect of the molten solder will "float" the ring to a position so close to center as to give final solder bonds sufficiently close to conditions of uniformity as will satisfy strength requirements of relatively low order.

Solder ring 41 is then positioned as illustrated in Fig. 32 and the soldering operation is carried out as described in connection with Figs. 5 and 6. The final effect is that illustrated in Fig. 33, wherein solder bonds 42k and 43k are of uniform thickness, and those bonds, as well as ring 35k and solder fillet 24k, serve the advantageous ends spoken of in connection with corresponding elements in Fig. 6.

While I have shown and described preferred embodiments of my invention, it is to be understood that various changes in design, structure and arrangements, as well as changes in the order of certain of the method steps, may be made without departing from the spirit and scope of the claims appended hereto.

I claim:

1. A drill pipe connection embodying a box member and a pin member threadably connected in axial alinement, an inserted ring between opposed peripheral faces of the members, a radially projecting, annular flange on the ring and engaging the peripheral face of one of the members, and a hard solder bond of capillary thickness between the members and the unflanged portion of the ring.

2. A drill pipe connection embodying a box member and a pin member threadably connected in axial alinement, an inserted ring between opposed peripheral faces of the members, radially projecting, internal and external annular flanges on the ring and engaging the opposing peripheral faces of the members, and hard solder bonds of capillary thickness between the members and the unflanged portions of the ring.

3. A spacer for insertion in the counterbore of the box member of a soldered pipe connection, embodying a ring, and an integral annular flange extending, in capillary amount, radially from one of the peripheral faces of the ring.

4. A spacer for insertion in the counterbore of the box member of a soldered pipe connection, embodying a ring, and a pair of integral, annular flanges extending, one each and in capillary amount, radially from the peripheral faces of the ring.

5. A spacer for insertion in the counterbore of the box member of a soldered pipe connection, embodying a ring, and an integral annular flange extending, in capillary amount, radially from one of the peripheral faces of the ring, the peripheral face of the flange being conical.

6. A spacer for insertion in the counterbore of the box member of a soldered pipe connection, embodying a ring, and an integral annular flange extending, in capillary amount, radially from one of the peripheral faces of the ring, the peripheral face of the flange and said one peripheral face of the ring being conical and of substantially the same degree of taper.

ALBERT L. STONE.

REFERENCES CITED

The following references are of record in the file of this patent:

UNITED STATES PATENTS

| Number | Name | Date |
|---|---|---|
| 1,881,943 | Rader | Oct. 11, 1932 |
| 1,999,706 | Spang | Apr. 30, 1935 |
| 2,005,189 | Herr | June 18, 1935 |
| 2,053,808 | Young | Sept. 8, 1936 |
| 2,083,528 | Burkart | June 8, 1937 |
| 2,181,343 | Reimschissel | Nov. 28, 1939 |
| 2,234,957 | Boynton | Mar. 18, 1941 |
| 2,249,469 | Gray | July 15, 1941 |